United States Patent [19]

Vosper

[11] 4,456,451

[45] Jun. 26, 1984

[54] APPARATUS FOR SHAPING ROPE ENDS

[76] Inventor: George W. Vosper, 149 Earl St., Kingston, Ontario, Canada, K7L 2H3

[21] Appl. No.: 427,444

[22] Filed: Sep. 29, 1982

[51] Int. Cl.³ .............................................. B29J 1/00
[52] U.S. Cl. .................................... 425/392; 249/78; 264/320; 425/403
[58] Field of Search ................... 425/11, 12, 392, 403; 249/78

[56] References Cited

U.S. PATENT DOCUMENTS 2,580,092  12/1951  Herbert et al. ...................... 425/392
2,733,478   2/1956  Schwieger ......................... 425/803

FOREIGN PATENT DOCUMENTS 1095822  6/1955  France ................................ 425/12

Primary Examiner—James H. Derrington
Attorney, Agent, or Firm—Stanley E. Johnson; Richard J. Hicks

[57] ABSTRACT

A method and apparatus for fusing and shaping the end of a rope, cord or the like made of heat fusible fibers avoiding the enlarged or bulbous end which normally occurs when heated in a conventional manner. The method involves inserting the cut end of a rope into a cavity of a member wherein the cavity tapers inwardly in a direction from an open end thereof to a closed bottom end, heating the member to melt the end of the rope thereby fusing together the strands and cooling the heated end of the rope to set the fused ends and shape the same to the internal shape of the cavity. The apparatus is a thin-walled, metallic member conically shaped and located at the end of a handle. A flared sleeve is also provided in which the end of the rope to be fused is inserted to compress the strands together before being heated. The conical member maybe heated by a butane torch or the like or alternatively, an electric resistance heating element maybe incorporated in a stem projecting from the handle.

7 Claims, 3 Drawing Figures

APPARATUS FOR SHAPING ROPE ENDS

FIELD OF INVENTION

This invention relates to a device for use in fusing and shaping the end of a rope, cord or the like made of heat-fusible fibers, i.e., thermoplastics material such as nylon, polypropolene and the like.

BACKGROUND OF INVENTION

Braided and/or spun rope when cut has a tendency to fray or unravel at the cut end and to avoid this, heat is applied to fuse the strands together. While this prevents unravelling it normally results in an enlarged or bulbous end that is larger than the diameter of the rope.

SUMMARY OF INVENTION

A principal object of the present invention is to provide a method and apparatus to simultaneously fuse the strands of a rope end together and shape the fused end so as to be no larger than the diameter of the rope.

In keeping with the foregoing there is provided in accordance with one aspect of the present invention a method of fusing and shaping the end of a rope made of heat-fusible fibers comprising the steps of (a) inserting the cut end of a rope into a cavity in a member wherein the cavity tapers inwardly in a direction from an open end thereof to a closed end; (b) heating the cavity to melt the end of the rope; and (c) cooling the heated end of the rope thereby resulting in strands of the rope being fused together and shaped to the internal shape of the cavity.

In accordance with another aspect of the present invention there is provided a device for sealing and shaping the end of the rope comprising a member having a tapered cavity therein made of a material so as to be heatable to a temperature above the melting temperature of a thermoplastic rope.

LIST OF DRAWINGS

The invention is illustrated by way of example in the accompanying drawings, wherein.

Figure 1:
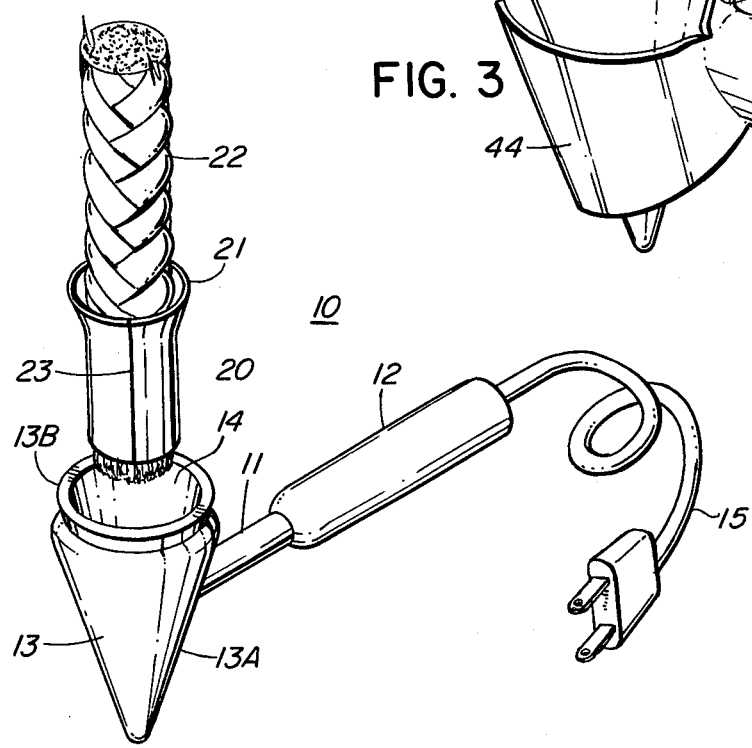
FIG. 1 is an oblique view of one device constructed in accordance with the present invention.

Referring to FIG. 1 there is illustrated a device 10 consisting of a stem 11 having an insulated hand-grip portion 12 at one end thereof and a heatable element 13 at the other end. The heatable element is made of a material suitable to withstand temperatures exceeding the melting temperature of a rope made of heat-fusible fibers. The heatable element 13 includes a first outer part 13A secured to the handle and optionally a removable insert 13B, the latter having a cavity 14, the internal surface of which is preferably conically-shaped. Obviously the cavity may be variously shaped depending upon the desired shape for the fused end of the rope. The cavity, generally speaking, has an open end for inserting the end of a rope thereinto and tapers inwardly in a direction toward a closed end, i.e., the bottom of the cavity. If desired, the insert 13B may be dispensed with and the internal surface of the portion 13A may be appropriately shaped for use in fusing the end of the rope.

Also provided is a sleeve 20, the internal diameter of which is related to the rope size and has an outwardly flared end 21 to facilitate inserting a rope 22 thereinto. The sleeve may be made of any material capable of withstanding the normal temperatures encountered in fusing the rope end and preferably is made of, or has a lining of, a heat-insulating material. The internal diameter of the sleeve should be slightly less than the normal rope size so that the rope to be shaped is compressed when inserted thereinto. The sleeve may have a longitudinal slit designated 23 in which case the sleeve should be made of a springy material permitting the use thereof on different sized ropes and at the same time compressing the rope when inserted into the sleeve. The sleeve also obviously prevents the rope from buckling when being pressed into the cone and facilitates centering the rope end in the cone.

The heatable element 13 may be heated in any manner, for example, by way of a butane or propane torch in which case a clip may be provided for detachably mounting the same on the nozzle of the torch. In the embodiment illustrated in FIG. 1 an electric resistance element is incorporated in the handle 12 (similar to, or the same as a hand-held electric soldering iron) the resistance element being connectable to a power supply by way of a cord 15.

Figure 2:
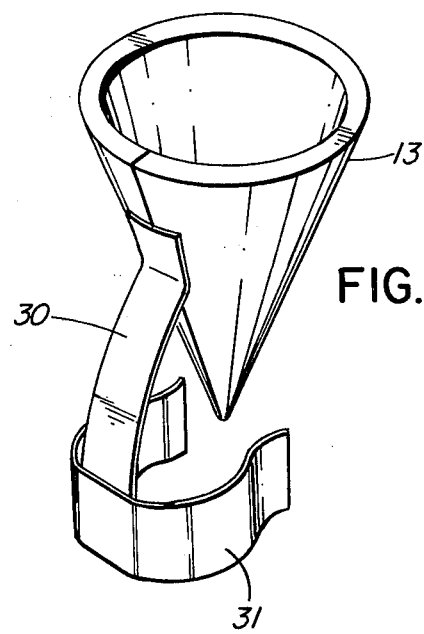
FIG. 2 is an oblique view of another embodiment.

FIG. 2 illustrates a modified embodiment wherein the heatable element 13 is a cone corresponding to part 13A illustrated in FIG. 1 and optionally may include the removable insert 13B. Attached to the conically-shaped, heatable element 13, by way of a strap 30, is a C-shape clip 31. The C-clip 31 pressingly fits onto the nozzle end portion of a propane torch so that the flame from the latter can heat the heatable element.

Figure 3:
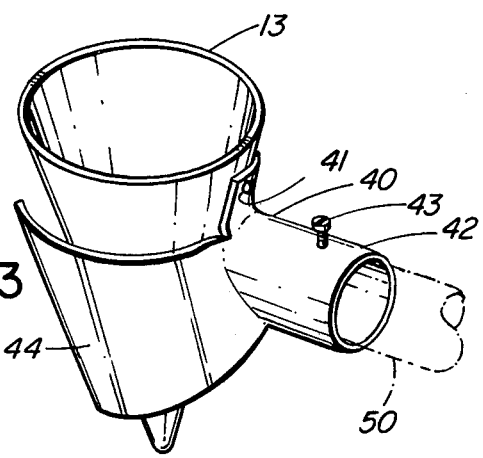
FIG. 3 is an oblique view of a still further embodiment.

FIG. 3 illustrates a still further embodiment wherein the heatable element 13 is a cone corresponding to part 13A illustrated in FIG. 1 and optionally may also include therein the removable insert 13B. The heatable element 13 is attached to a flame-directing and torch mounting element 40 by way of a rivet 41, spot welding or the like. The device 40 includes a sleeve 42 for slip-fitting over an end portion 50 of the nozzle of a propane torch and may be locked in position by way of a set screw 43 threaded into the sleeve 42 and projecting thereinto. The sleeve 42 is split along a portion of the length thereof at the end remote from the torch mounting end and provides a pair of wings 44 that curve around the heatable element 13 and are spaced therefrom. The wings 4, only one being shown, are located respectively on opposite faces of the conically-shaped heatable element and appropriately direct the flame from the propane torch for efficiently heating the conical member 13.

To fuse and shape the end of a rope, the rope 22 is inserted into the sleeve 20 so as to project slightly therebeyond and when the heatable element is at a suitable temperature the projecting end portion of the rope is inserted into the cavity of the conically shaped element. The heat is sufficient to fuse together the fibers of the rope, whereafter the fused ends are cooled in a suitable manner. This results in the fused end being shaped and of a size smaller than the diameter of the remainder of the rope.

The embodiments of the invention in which an exclusive property or privilege is claimed are defined as follows:

1. A device for use in fusing and shaping the end of a rope made of heat fusible fibers comprising a heatable element mounted on the free end of a stem having an insulated handle thereon said heatable element having a cavity therein and made of a material so as to be heatable to a temperature above the melting temperature of the rope fibers, a thin-walled, conically-shaped insert removably mounted in the cavity of said heatable element and a sleeve for inserting therein the end of a rope to be heat fused, said sleeve being flared outwardly at one end to facilitate insertion of the rope.

2. A device as defined in claim 1, wherein said sleeve is a split sleeve, the split of which extends longitudinally therealong.

3. A device for fusing and shaping the end of a rope made of heat-fusible fibers, comprising a stem having an insulated hand-grip attached thereto at one end thereof, and a heatable element at the other end, said heatable element including a first portion secured to the handle and having a cavity receiving therein a replaceable insert consisting of a thin-walled, conical member and a separate sleeve for inserting thereinto one end of a rope to be shaped and fused in the insertable member, said sleeve being flared outwardly to facilitate insertion of the rope thereinto and generally being of a diameter less than the diameter of the rope, thereto to compress the rope prior to being fused.

4. A device as defined in claim 3, wherein said sleeve is a split sleeve, the split of which extends longitudinally therealong.

5. A device for fusing and shaping the end of a rope made of heat fusible fibers comprising:
- a conically-shaped heatable element;
- a sleeve secured to said conically-shaped member and projecting therefrom for receiving an end portion of the nozzle of a propane torch or the like; and,
- at least one wing member extending from said sleeve partially around the conically-shaped member and spaced therefrom for directing the flame from the torch onto the outer surface of the heatable element.

6. A device as defined in claim 5, wherein the axis of the sleeve is substantially perpendicular to the axis of the conically-shaped member.

7. A device as defined in claim 6, wherein there are a pair of wing members and wherein such wing members are integrally formed with said sleeve.

* * * * *